United States Patent
Ohwe

[11] Patent Number: 5,825,590
[45] Date of Patent: Oct. 20, 1998

[54] MAGNETIC HEAD SUSPENSION MECHANISM WITH A THIN FILM THEREON FOR CREATING A BENT PORTION OF A VIBRATION ABSORBING PORTION

[75] Inventor: Takeshi Ohwe, Kawasaki, Japan

[73] Assignee: Fujitsu Limited, Kawasaki, Japan

[21] Appl. No.: 585,023

[22] Filed: Jan. 11, 1996

[30] Foreign Application Priority Data

Apr. 18, 1995 [JP] Japan .................................... 7-092346

[51] Int. Cl.⁶ ....................................................... G11B 5/48
[52] U.S. Cl. ............................................................. 360/104
[58] Field of Search ............................................. 360/104

[56] References Cited

U.S. PATENT DOCUMENTS

| 4,819,094 | 4/1989 | Oberg ...................................... 360/104 |
| 5,539,596 | 7/1996 | Fontana ................................... 360/104 |

FOREIGN PATENT DOCUMENTS

| A63878 | 1/1988 | Japan . |
| A63-281283 | 11/1988 | Japan . |
| A562405 | 3/1993 | Japan . |
| A5189906 | 7/1993 | Japan . |
| 6103717 | 4/1994 | Japan . |

*Primary Examiner*—A. J. Heinz
*Attorney, Agent, or Firm*—Greer, Burns & Crain, Ltd.

[57] ABSTRACT

A magnetic head suspension mechanism used in a magnetic disk apparatus includes a rotating magnetic recording medium and a means for accessing an electromagnetic transducer head to the recording medium to write or read any information with respect to the recording medium. The head suspension mechanism includes a load beam having at least a part thereof defining an elastic portion and at least the other part thereof defining a rigid portion for holding an electromagnetic head via a gimbal. A thin film is directly formed on the elastic portion of the load beam, the thin film being expandable or shrinkable due to an internal stress of the film itself.

9 Claims, 6 Drawing Sheets

MAGNETIC HEAD SUSPENSION MECHANISM WITH A THIN FILM THEREON FOR CREATING A BENT PORTION OF A VIBRATION ABSORBING PORTION

BACKGROUND OF THE INVENTION

1. Field of the Invention

This invention generally relates to a magnetic disk apparatus and, more particularly, to a magnetic head suspension mechanism.

2. Description of the Related Art

A magnetic head suspension mechanism known in the prior art comprises an air-bearing head slider on which an electromagnetic transducer is mounted, a gimbal spring for supporting the slider, a load beam for holding the gimbal spring, and a spacer for holding the load beam. The load beam comprises a rigid portion and an elastic portion which is provided with mechanical bent portion, usually referred to as an "R-bent" portion, which generates a load for urging the slider toward the recording medium, so that the slider is pushed to the recording medium with a certain necessary load. Thus, when the recording medium (i.e., a magnetic recording disk) is rotating, in a reproduction mode, the load exerted on the slider and a flying force exerted on a flying surface of the slider due to an air flow are balanced to each other, so that the slider is flying above the recording medium with a very fine gap.

There are several types of prior art magnetic head suspension mechanism as mentioned below. A conventional head suspension comprises a load beam, in which thermal energy is given to a spring portion of the load beam to regulate the spring force of the load beam (see Unexamined Patent Publication (Kokai) No. 5-189906). Another head suspension comprises a load beam, in which a spring portion thereof is made of a super-elastic material, such as a shape memory alloy (see Unexamined Patent Publication (Kokai) No. 63-281283). After a load of a gimbal assembly is regulated, the gimbal assembly is subjected to a thermal treatment and annealed at a low temperature (see Unexamined Patent Publication (Kokai) No. 63-878). A part of load beam is cut and bent upward to give a load for urging an electromagnetic head toward the recording medium (see Unexamined Patent Publication (Kokai) No. 5-62405). A flexible tongue is extended from a gimbal spring and a pushing force is exerted to a tip end of the gimbal spring, by which an electromagnetic head is urged toward the recording medium (see Unexamined Patent Publication (Kokai) No. 6-103717).

In the above-mentioned prior art, although stability of the load beam can be attained, the manufacturing process becomes complicated and the manufacturing cost is high.

In Unexamined Patent Publication (Kokai) No. 2-215513, a gimbal spring or portion which is formed by the load beam itself is provided, at the respective sides of the portion on which an electromagnetic head is mounted, with T-shaped beams to reduce the rotation rigidity of the gimbal portion without lowering of the resonant frequency.

SUMMARY OF THE INVENTION

An object of the present invention is to provide a magnetic head suspension mechanism used in a magnetic disk apparatus, in which a load beam accurately generates a load, so that a change of load can be reduced to improve the reliability and increase the cost performance.

According to an aspect of the present invention, there is provided a magnetic head suspension mechanism used in a magnetic disk apparatus comprising a rotating magnetic recording medium and means for accessing an electromagnetic transducer head to the recording medium to write or read any information with respect to the recording medium, the head suspension mechanism comprising: a load beam having at least a part thereof defining an elastic portion and at least the other part electromagnetic head via a gimbal; and a thin film directly formed on the elastic portion of the load beam, the thin film being expandable or shrinkable due to an internal stress in the film itself.

The thin film may be at least one selected from a group consisting of a metal film, an oxidized film, a resin film, a ceramic film, and a non-metal film.

The thin film may be a single layered film. Alternatively, the thin film may consist of a plurality of layers. In this case, the plurality of layers may either consist of a single kind of or may also consist of different kinds of layers. The plurality of layers may consist of at least one metal layer and at least one protective film covering the metal layer to protect the metal layer from being corroded.

The second thin film may be formed on the rigid portion of the load beam.

According to another aspect of the present invention, there is provided a magnetic head suspension mechanism used in a magnetic disk apparatus comprising a rotating magnetic recording medium and means for accessing an electromagnetic transducer head to the recording medium to write or read any information with respect to the recording medium, the head suspension mechanism comprising: a load beam having at least a part thereof defining an elastic portion and at least another part thereof defining a rigid portion for holding an electromagnetic head via a gimbal; and a thin film directly formed on the rigid portion of the load beam to absorb vibration of the load beam.

According to still another aspect of the present invention, there is provided a magnetic head suspension mechanism used in a magnetic disk apparatus comprising a rotating magnetic recording medium and means for accessing an electromagnetic transducer head to the recording medium to write or read any information with respect to the recording medium, the head suspension mechanism comprising: a load beam having at least a part thereof defining an elastic portion and at least another part thereof defining a rigid portion; a gimbal portion formed as a part of, and integrally with, the rigid portion for holding an electromagnetic head; and a thin film directly formed on the gimbal portion for absorbing vibration of the gimbal.

The thin films may be formed on the respective surfaces of the gimbal portion.

DESCRIPTION OF THE PREFERRED EMBODIMENTS

Figure 1:
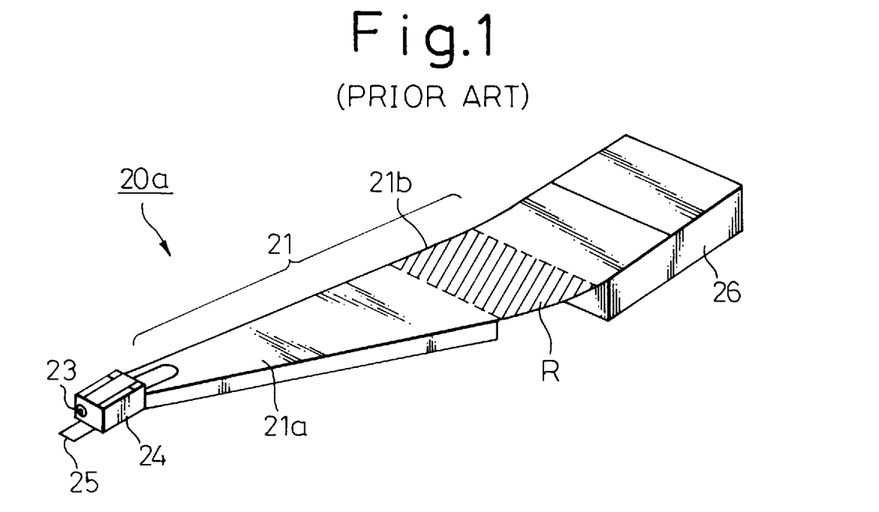
FIG. 1 is a perspective view illustrating an example of a magnetic head suspension mechanism known in the prior art.
Figure 2:
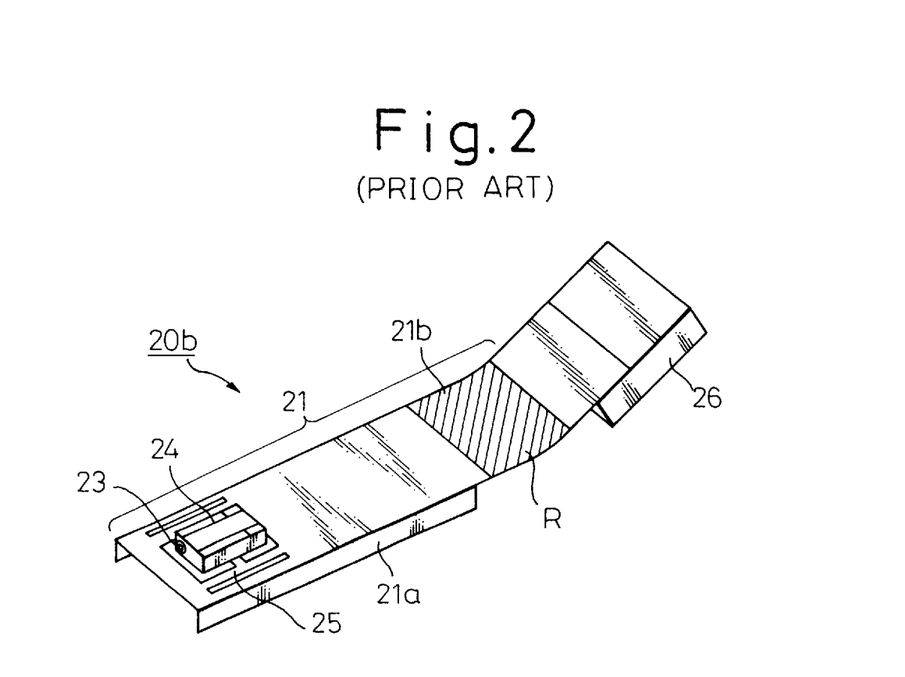
FIG. 2 is a perspective view illustrating another example of a magnetic head suspension mechanism known in the prior art.
Figure 3:
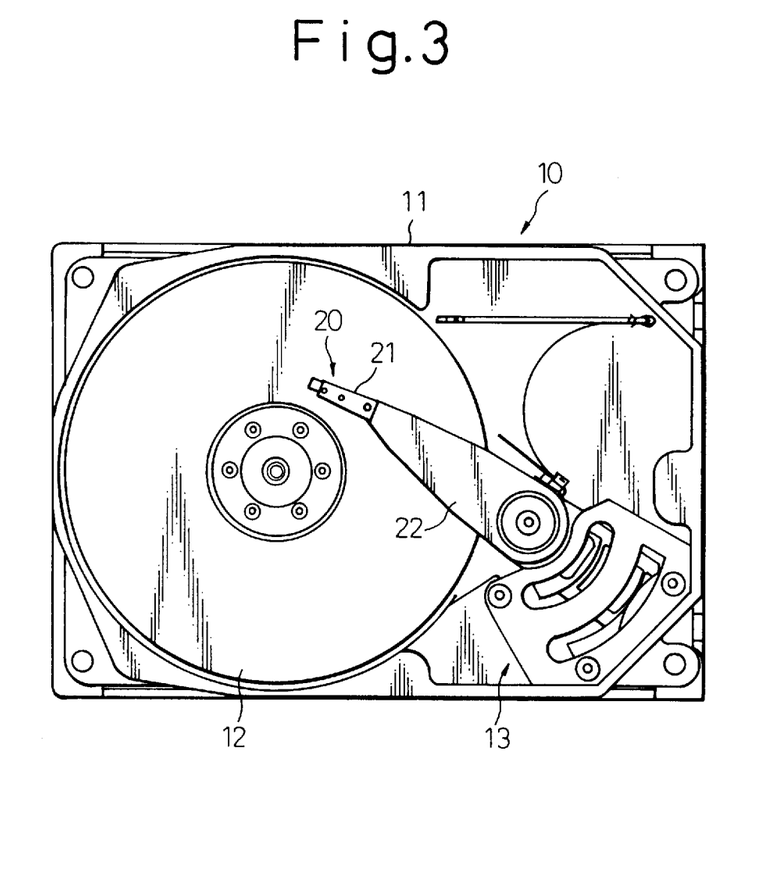
FIG. 3 is a plan view of a magnetic disk apparatus using a magnetic head suspension mechanism of this invention.

Before describing particular embodiments of this invention, conventionally known magnetic head suspension mechanisms will now be described. FIGS. 1 and 2 show examples of electromagnetic head suspension mechanisms conventionally known in the prior art, in which a load beam of the suspension has a so called "R-bent" portion. FIG. 3 is a plan view of a 3.5 inch-sized magnetic disk apparatus using such a magnetic head suspension mechanism.

First of all, there is shown in FIG. 3 a magnetic disk apparatus 10 having such a structure that 3.5 inch-sized magnetic disks 12, a head positioning actuator 13 and other elements or parts are accommodated in an enclosure 11. A magnetic head suspension mechanism 20 comprises a stainless steel load beam 21 rigidly mounted on a spacer member of an arm 22 of the actuator 13.

In FIG. 1, a conventional type electromagnetic head suspension mechanism 20a is shown, in which a load beam 21 comprises a rigid portion 21a and an elastic portion 21b provided with a "R"-bent portion. A slider 24, which mounts thereon an electromagnetic head element or transducer 23, is fixed on the rigid portion 21a of the load beam 21 by means of a gimbal 25. The elastic portion 21b of the load beam 21 is mounted on the spacer 26 which is attached to the arm portion 22 (FIG. 3) of the actuator.

A magnetic head suspension mechanism 20b shown in FIG. 2 comprises a load beam 21 and a gimbal 25 formed integrally with the load beam 21. The load beams 21 has a substantially uniform width from one end on which a slider 24 is mounted to the other end (i.e., the elastic portion 21b). The gimbal 25 is formed integrally with the load beam 21 by forming slits, openings or the like in a free end of the rigid portion 21a of the load beam 21.

In FIGS. 1 and 2, the respective sides of the rigid portion 21a of the load beam 21 are provided with bent angled portions to provide rigidity. On the other hand, the elastic portion 21b providing with an "R"-bent portion has no such angled portions and thus is generally elastic.

In the conventional magnetic head suspension mechanisms 20a and 20b, the size thereof is relatively large (the total length is 20–30 mm), the load is also relatively large (several grams) and the thickness of stainless plate is also relatively large (50–80 $\mu$m). Therefore, it is not difficult to obtain the R-bent portion by a mechanical bending process. However, in recent electromagnetic disk apparatuses, in order to improve the head/disk interface characteristic, the size of the magnetic head suspension mechanism and the load thereof has become smaller. For example, the size of the magnetic head suspension mechanism is such that the total length thereof is about 10 mm and the load is not more than 1 g. In addition, the thickness of the stainless plate becomes less and less, such as not more than 25 $\mu$m. In response to these changes in the requirements for the magnetic head suspension mechanism, it becomes difficult to accurately obtain a certain load by applying mechanical processing of an R-bent to the elastic portion of the load beam in the magnetic head suspension mechanism. Also, when an mechanical processing is applied to the load beam to obtain a R-bent portion, problems such as bending, twisting or curving will occur to the supporting means, such as a jig, for supporting the magnetic head suspension mechanism. Thus, the reliability of the electromagnetic head suspension mechanism will be reduced.

When a carriage on which the magnetic head suspension mechanism is mounted is under a seeking operation, the magnetic head suspension mechanism is of course affected by the vibration of the carriage itself. Thus, the positioning efficiency of the electromagnetic head will be reduced and therefore the reliability of the disk apparatus is also reduced. For these reasons, it becomes a problem how to prevent the vibration which is transmitted to the magnetic head suspension mechanism from the carriage during the seeking operation.

Some embodiments of the magnetic head suspension mechanism of the present invention now be described in detail with reference to FIGS. 4 to 7. In these embodiments, the gimbal portion 25 and the load beams 21 are integrally made of a single member. A stainless (SU) plate or strip is suitable to be used as such a member and the thickness thereof is about 25 $\mu$m. In the same manner as the prior art, the load beam 21 has a part thereof defining an elastic portion 21b and the other part thereof defining a rigid portion 21a. The rigid portion 21a is provided at the respective sides thereof with bent angled walls to give a rigidity to the rigid portion 21a. The gimbal portion 25 is formed by slits, openings or the like at a tip end (the rigid portion 21a) of the load beam 21. That is, as most apparently shown in FIG. 6, the gimbal portion 25 is defined by forming a pair of U-shaped slits or openings 31 and 32, which are arranged to face to each other in the longitudinal direction of the load beam 21, and a pair of longitudinal slit-like openings 33 and 34 arranged along the respective sides of the load beam 21. The gimbal portion 25 has a mount portion 35 on which the electromagnetic head slider is fixedly mounted, a pair of first beam portions 36 (only one is shown in the drawing) and a pair of second beams 38 and 39.

Figure 6:
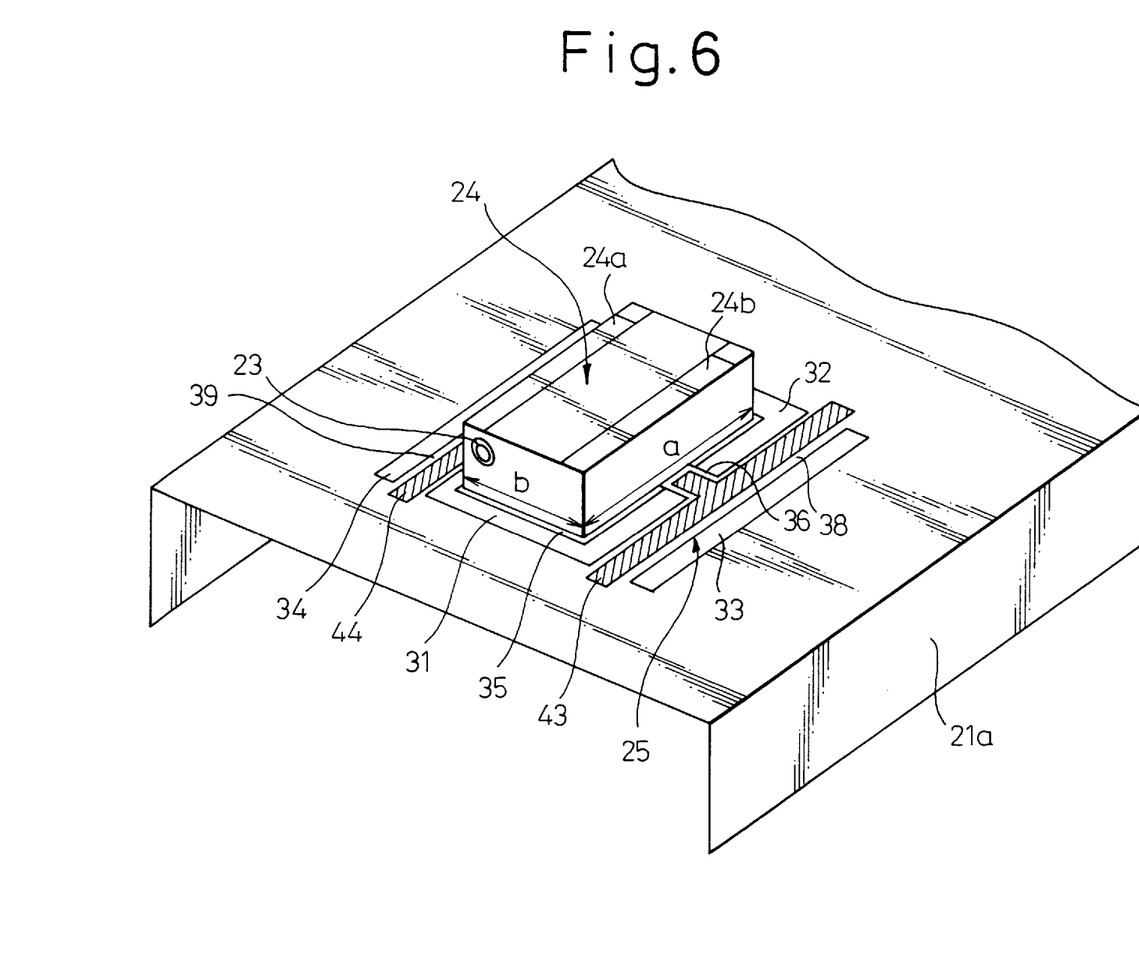
FIG. 6 is an enlarged perspective view of still another embodiment of a magnetic head suspension mechanism of this invention.

In FIG. 6, the electromagnetic head slider mounting portion 35 has, in a plan dimension such a size sufficient to mount thereon the electromagnetic head slider 24 for example, a×b which corresponds to the size of, for example, an electromagnetic head slider 24 having plan outline dimensions (a=2 mm, b=1.6 mm). However, if adhesive strength is sufficient, it will be possible to smaller sized mounting portions 35. It is more advantageous that the electromagnetic head slider is one having a light weight structure to maintain reliability of the disk apparatus. The back surface of the slider opposite to the flying surface is flat, so that the back surface can be attached to the mounting portion 35 by means of an adhesive. In this case, the center of the slider should be aligned with the center of the mounting portion 35.

The first beams 36 extend outwardly from the respective sides of the mounting portion 35 along a line passing through the center of the mounting portion 35 (i.e., the center of the slider) and crossing the longitudinal center line of the load beam over the mounting portion 35. The second beams 38 and 39 are connected at the center thereof to the outer ends of the respective first beams 36 and extend in parallel to each other to be perpendicular to the first beams 36. The respective ends of each second beam are connected to the peripheral portion of the gimbal 25 of the load beam 21. Thus, the second beams 38 and 39 are both-end connected levers and extend from the central portions, to which outer ends of the respective first beams 36 are connected, to the respective ends. Thus, the second beams 38 and 39 cooperate with the first beams 36 to constitute a pair of T-shaped beams and also constitute an H-shaped beam as a whole.

Thus, the mounting portion 35, the first beams 36 and the second beams 38 and 39 are formed as integral parts of the load beam 21 itself.

As mentioned above, the slider 24 on which an electromagnetic head 23 is mounted is fixedly attached to the slider mounting portion 35 of the gimbal 25 and is provided on the surface opposite to the magnetic disk, i.e., magnetic recording medium (i.e., the upper surface in the drawings), with rails 24a and 24b, so that the slider 24 is maintained with a very fine gap with respect to the magnetic recording medium in response to the balance between the flying force caused by the air generated between the magnetic disk and the slider due the rotation of the magnetic disk and a pushing force given by the magnetic head suspension mechanism, particularly the load beam 21, during a recording or reading operation.

If the magnetic disk is undulated or has dust attached, the slider 24 may be turned in the pitching direction with the T-shaped first and second beams 36 and 38, 39. In this case, the first beams 36 of the gimbal are twisted and, on the other hand, the second beams 38 and 39 are bent. The slider 24 may also be turned in the rolling direction and, in this case, the pair of first beams 36 of the gimbal are bent in opposite directions to each other and second beams 38 and 39 are also bent and twisted in the opposite directions to each other. In this way, the slider 24 is resiliently supported on the gimbal portion 25 to be swingable in both the pitching and rolling directions.

Figure 4:
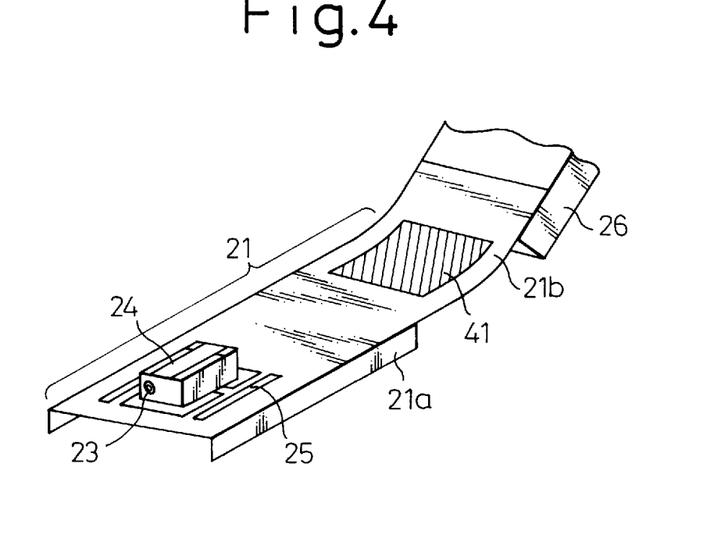
FIG. 4 is a perspective view of an embodiment of a magnetic head suspension mechanism according to the present invention.

FIG. 4 shows a first embodiment of a magnetic head suspension mechanism of this invention. In this embodiment, a film 41 is directly formed on the elastic portion 21b of the load beam 21 of the magnetic head suspension mechanism. Due to an internal stress in the film 41, the elastic portion 21b can be bent so as to form a bending portion which is substantially the same as the mechanically formed R-bent portion. Such a bending portion gives rise to a load which urges slider 24 held at the end of the magnetic head suspension mechanism toward the magnetic disk 12 (FIG. 3), i.e., magnetic recording medium. The film 41 may be a metal film, an oxidized film, a resin film, a carbon film, a silicone film, a ceramics film, a non-metal film, or the like. A method for forming such a film depends on the kind of such a film, to be formed. For example, sputtering, vaporing, plating, coating, or the like can be applied. The film may actually be CU, Cr, Ni, Au, Ti, DLC, NiFe, ITO, $SiO_2$, polyimide, resist, $TIO_2$, $Al_2O_3$, $ZrO_2$, $Si_3N_4$, SiC, chrome oxide, or titanboride, Si, or the like.

After the film 41 is formed, such a film may be either one of the following types, an expansion type film (which generates an outward stress) or a shrinkage type film (which generates an inward stress). Depending on the direction of the stress in the film, it is determined on which surface of the load beam 21 the film should be formed. For example, the expansion film should be formed on the surface of the load beam opposite to the slider 24 and the shrinkage film should be formed on the same surface of the load beam on which the slider 24 is mounted. If the stress is too weak to obtain a predetermined load, the thickness of the film should be increased, or two or more of the same or different films should be layered to increase the stress. In case of a metal film, in order to prevent corrosion, it is advantageous that the film 41 is further coated with a protective film, such as a polyimide film.

In addition, in order to increase (1) the reliability or adhesive performance between the film and the stainless steel used as a base material for the load beam 21 of the magnetic head suspension mechanism, (2) the reliability or adhesive performance between the film and the protective film; and (3) the reliability or adhesive performance between two or more same or different film layers, it is advantageous that a very thin layer is formed between the above-mentioned films. In order to further increase the stress, it is advantageous that the load beam is used in such a manner that the shrinkage and the expansion sides of the load beam are used as a slider mount side and an opposite side, respectively. Although, in this embodiment, the above-mentioned film is formed on the elastic portion 21b of the load beam 21, part of such film may be extended to the rigid portion 21a for the reasons as mentioned above.

Figure 5:
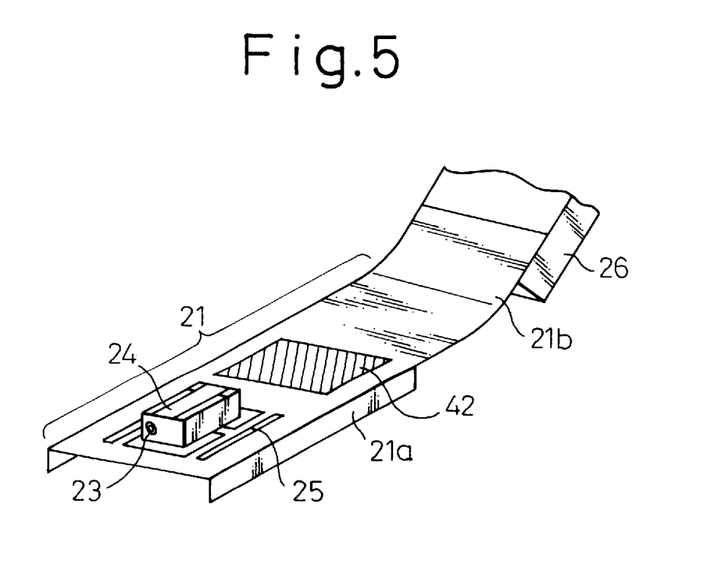
FIG. 5 is a perspective view of another embodiment of a magnetic head suspension mechanism of this invention.

FIG. 5 shows a second embodiment of a magnetic head suspension mechanism. In this embodiment, a film 42 is directly formed on the rigid portion 21a of the load beam 21 of the magnetic head suspension mechanism. Such a film 42 may be formed on either one of the upper or lower surfaces of the rigid portion of the load beam 21 without regard to the kind of the film 42. The film 42 serves to absorb and restrict the vibration of the load beam. Although there has been an attempt to adhere the damping members one by one to a load beam so as to absorb the vibration thereof, such a method is less effective and it is difficult to reduce the cost of manufacturing the same. According to a method of this invention, since the magnetic head suspension mechanism can be manufactured on the basis of a batch process, it will be possible to reduce the cost.

FIG. 6 shows a third embodiment of a magnetic head suspension mechanism. In order to expand the damping effect, the films may be directly formed not only on the load beam 21, but also on the gimbal portion 25, as in this embodiment. Particularly, a pair of T-shaped films 43 and 44 are adhered to the above-mentioned pair of T-shaped beams formed by the pair of first beams 36 and the pair of second beams 38 and 39. These films 43 and 44 have similar shapes as the pair of T-shaped beams. Since the vibration of the gimbal portion 25 can be absorbed by these films 43 and 44, the same effects as mentioned above can be obtained.

However, in this embodiment, it is more advantageous that such films are adhered to both the upper and the lower surfaces of the gimbal portion to prevent the gimbal portion 25 from being bent due to the film stress. In order to obtain a better damping effect, it is also advantageous that the thickness of the film is increased or a plurality of the same or different kinds of films are layered. Of course, if a metal film is used, it is advantageous that such a metal film is coated with a protective film, such as a polyimide film, to prevent corrosion.

Figure 7:
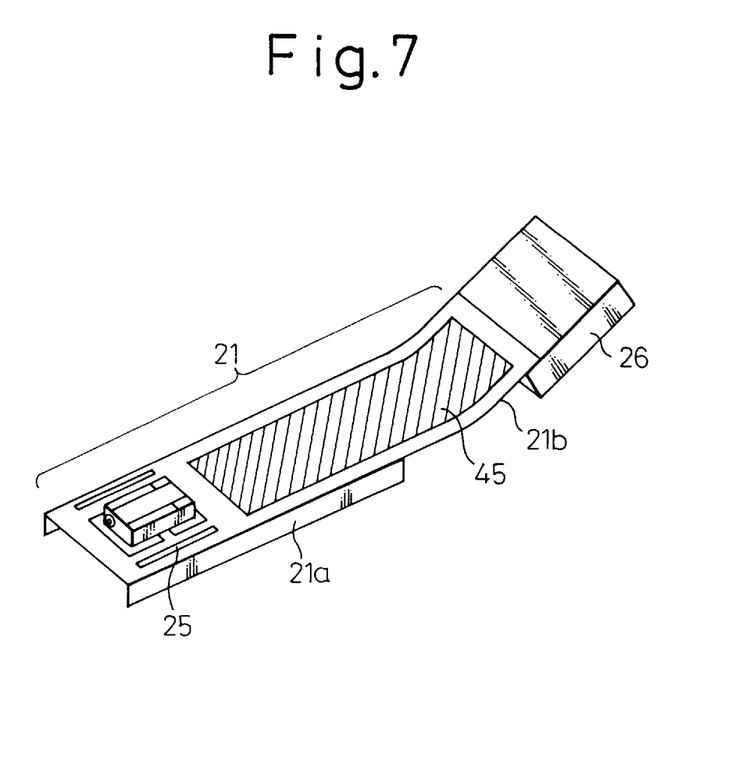
FIG. 7 is a perspective view of a further embodiment of an electromagnetic head suspension mechanism of this invention.

FIG. 7 shows a fourth embodiment of a magnetic head suspension mechanism of this invention. In this embodiment, a film 45 is directly formed to extend from the elastic portion 21b to the rigid portion 21a of the load beam 21. Since the film 45 is formed on such a position, both effects, i.e., the load generation effect and the damping effect, can be obtained simultaneously. In the same manner as in the previous embodiments, the film 45 may be a plurality of layers or may be coated with a protective film.

Figure 8:
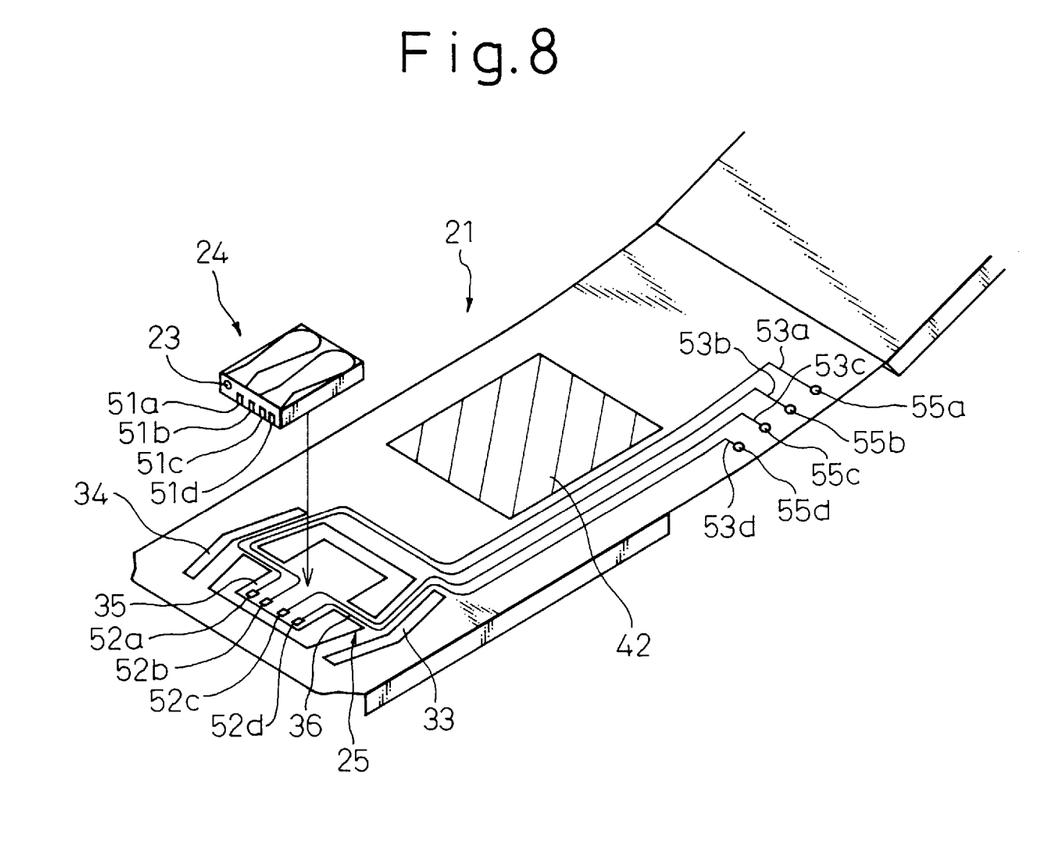
FIG. 8 is a view of the embodiment similar to that of FIG. 5, but showing signal patterns extending to the magnetic head slider.

FIG. 8 shows an embodiment which is the same as the second embodiment, but also shows signal patterns for the electromagnetic head slider 24. In FIG. 8, the electromagnetic head slider 24 has its terminals 51a–51d. On the other hand, the head mounting portion 35 of the load beam 21 is provided with terminals 52a–52d with which the terminals 51a–51d of the magnetic head slider 24 come into contact. The load beam 21 is also provided thereon with signal patterns 53a–53d and terminals 55a–55d with which outside lines come into contact. If the signal patterns 53a–53d are formed by the same conductive material as the film 42, such patterns and film can be directly formed simultaneously, so that manufacturing steps and cost can be reduced as compared with a conventional process.

Although, in the above-mentioned embodiments, the film directly formed on the load beam 21 is rectangular, such a film should not be limited to being rectangular shaped, but may be circular, oval, or triangular. Also, in the above embodiments, although the gimbal portion 25 and the load beam 21 are integrally formed, the present invention can also be applied to such a magnetic head suspension mechanism in which the gimbal 25 and the load beam 21 are separately formed as shown in prior art FIG. 1.

It should be understood by those skilled in the art that the foregoing description relates to only a preferred embodiment of the disclosed invention, and that various changes and modifications may be made to the invention without departing from the spirit and scope thereof.

I claim:

1. A magnetic head suspension mechanism used in a magnetic disk apparatus comprising a rotating magnetic recording medium and means for accessing an electromagnetic transducer head to said recording medium to write or read any information with respect to said recording medium, said head suspension mechanism comprising:

a load beam made of a metal strip and having at least a part thereof defining an elastic portion, which is originally substantially flat, and at least another part thereof defining a rigid portion for holding an electromagnetic head via a gimbal, said rigid portion having at least one rib at an edge thereof; and a thin film formed on said elastic portion of the load beam, said thin film being expandable or shrinkable due to an internal stress of said film itself, and whereby said internal stress of said thin film causes said originally substantially flat elastic portion to bend.

2. A head suspension mechanism as set forth in claim 1, wherein said thin film is made from at least one material selected from a group consisting of a metal film, an oxidized film, a resin film, a ceramic film, and a non-metal film.

3. A head suspension mechanism as set forth in claim 1, wherein said thin film is a single layered film.

4. A head suspension mechanism as set forth in claim 1, wherein said thin film consists of a plurality of layers.

5. A head suspension mechanism as set forth in claim 4, wherein said plurality of layers consist of a single type of material.

6. A head suspension mechanism as set forth in claim 4, wherein said plurality of layers consist of different types of materials.

7. A head suspension mechanism as set forth in claim 6, wherein said plurality of layers consist of at least one metal layer and at least one protective film covering said metal layer to protect said metal layer from being corroded.

8. A head suspension mechanism as set forth in claim 1, further comprising second thin film formed on said rigid portion of the load beam.

9. A head suspension mechanism as set forth in claim 8, wherein said second thin film is continuously extended from said first thin film formed on said elastic portion of the load beam, whereby said first and second thin films are an integral, single thin film.

* * * * *